G. W. ROBNETT.
PIPE JOINT.
APPLICATION FILED APR. 1, 1913.
1,135,325.
Patented Apr. 13, 1915.
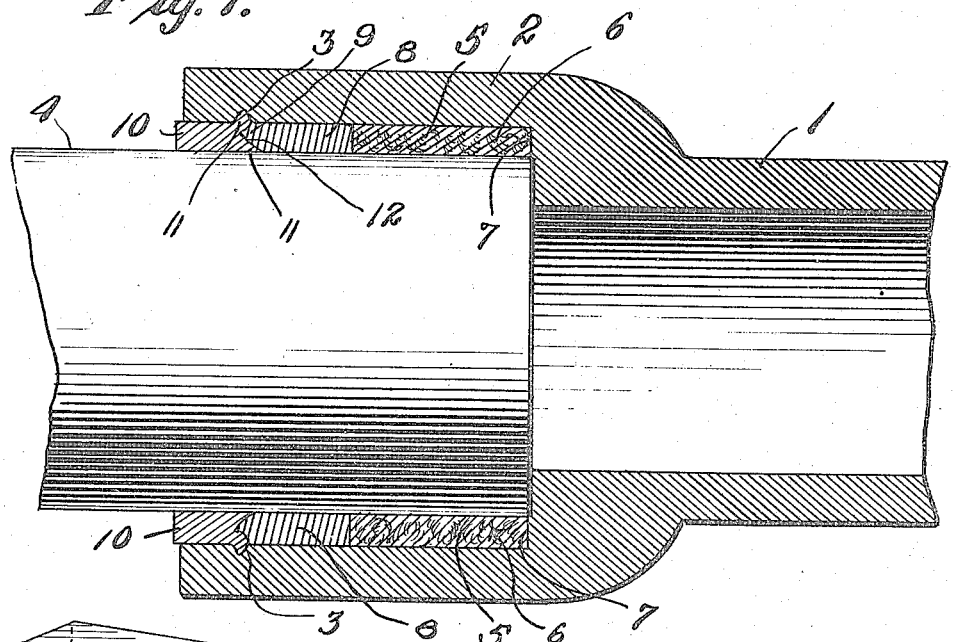
Fig. 1.
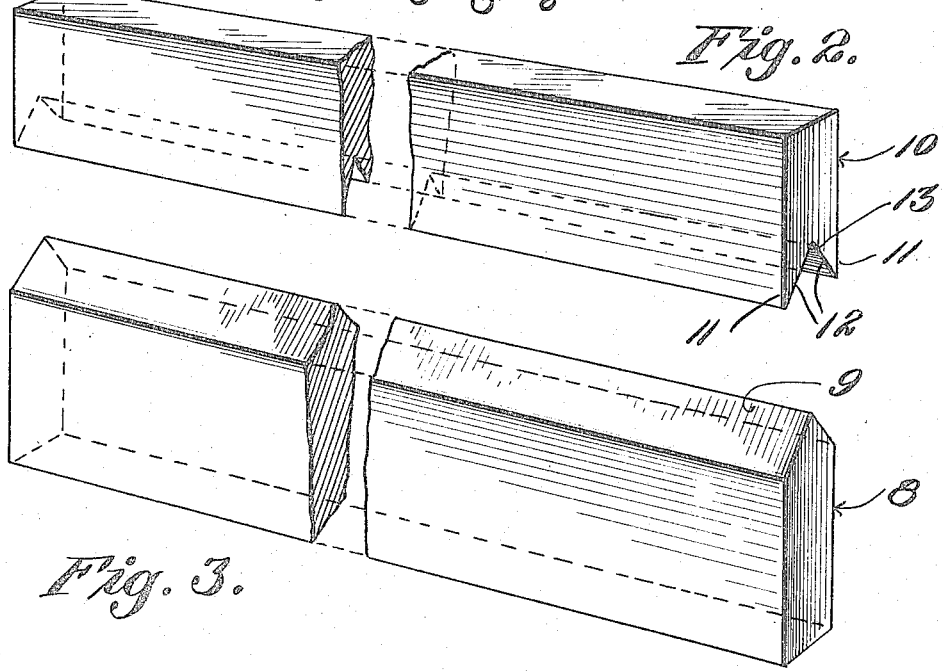
Fig. 2.
Fig. 3.
Witnesses
Inventor
George W. Robnett
By Victor H. Wallace
Attorneys

UNITED STATES PATENT OFFICE.

GEORGE W. ROBNETT, OF CHICAGO, ILLINOIS.

PIPE-JOINT.

1,135,325. Specification of Letters Patent. Patented Apr. 13, 1915.

Application filed April 1, 1913. Serial No. 758,223.

*To all whom it may concern:*

Be it known that I, GEORGE W. ROBNETT, citizen of the United States, residing at Chicago, in the county of Cook and State of Illinois, have invented new and useful Improvements in Pipe-Joints, of which the following is a specification.

The present invention is directed to improvements in pipe-joints, and has for its object to produce a joint of this type which is exceedingly simple and one which is inexpensive.

A further object of the invention is to produce a pipe joint which does not necessitate the use of "lead wool," which is not only expensive, but is very delicate and has to be handled with extreme care, ofttime requiring a great length of time in applying, and the employment of several persons to make the joint.

A still further object is to produce a joint wherein the employment of poured lead is eliminated.

With these and other objects in view, this invention resides in the novel features of construction, formation, combination and arrangement of parts to be hereinafter more fully described, claimed and illustrated in the accompanying drawing, in which:—

Figure 1 is a longitudinal sectional view through the joint. Fig. 2 is a detail perspective view of one of the sealing strips. Fig. 3 is a similar view of the other sealing strips.

Referring to the drawing, the numeral 1 designates a section of a pipe having the enlargement 2 formed thereon, said enlargement having formed interiorly thereof, and adjacent the outer end an annular groove 3, the purpose of which will appear later.

The numeral 4 designates a pipe section, which when engaged in the enlargement 2 of the section 1 provides an annular space 5 which heretofore has been packed with "lead wool" or has been filled with molten lead to make the joint.

In carrying out the present invention a packing 6 of rope oakum or some similar material is first tamped in the space 5 and against the shoulder 7, after which the strip 8 is inserted. The strip 8 is formed from lead and is made in separate lengths which may be readily bent to correspond to the circumference of the space 5. One edge of the strip 8 is beveled, as at 9, the purpose of which will hereinafter appear. The other strip 10 is also formed from lead and in separate lengths, and is adapted for insertion in the space 5 for engagement with the strip 8. The strip 10 has its inner edge formed with furcations 11, the opposing faces of which are inclined, as at 12, thus providing a V-shaped groove 13 which is engaged by the beveled end of the strip 8, when the same is driven in the space 5.

Thus it will be seen that after the packing 6 has been properly placed in the space 5, that to complete the joint, it is only necessary to force the strip 8 into place, after which the strip 10 is forced in said space, whereupon the V-shaped groove will be engaged by the beveled edge of the strip 8, which results in the outermost furcation of the strip 10 being deflected into the annular groove 3 formed in the enlargement 2, thus not only locking said strip against displacement, but the strip 8 and packing 6 as well, and at the same time forms a positive water or air tight joint, without the use of poured lead or "lead wool." It will be understood that when the strip 8 is driven against the strip 10 that the points of contact will naturally be distorted, as the strips are pliable, but for the sake of clearness, this has not been exaggerated in the drawing. It will be obvious that the strips can be made in any length desired, and can be sold either bent or flat, as deemed advisable.

What is claimed is:—

In a pipe joint, the combination with the meeting ends of the pipe sections, one of which is formed with an enlargement, an annular groove formed interiorly of said enlargement, of a lead strip inserted between the meeting ends of the sections and having its outer edge beveled, a second lead strip having inclined furcations formed upon its inner edge for engagement with the beveled end of the first named strip, whereby when pressure is applied to the second named strip the outermost furcation will be deflected into the annular groove and simultaneous therewith the innermost furcation is deflected into binding engagement with one of the pipe sections, and a packing disposed between the pipe ends for limiting the movement of the second named strip in one direction.

In testimony whereof I have hereunto set my hand in presence of two subscribing witnesses.

GEO. W. ROBNETT.

Witnesses:
ARTHUR MORSTADT,
TOWNLEY WALLACE.